(12) United States Patent
Jung

(10) Patent No.: US 10,616,455 B2
(45) Date of Patent: Apr. 7, 2020

(54) OBJECT PHOTOGRAPHING SYSTEM USING SPIRAL RAIL

(71) Applicant: WEAROBO, INC., Incheon (KR)

(72) Inventor: Joo Hyuk Jung, Incheon (KR)

(73) Assignee: WEAROBO, INC., Seoul (KR)

( * ) Notice: Subject to any disclaimer, the term of this patent is extended or adjusted under 35 U.S.C. 154(b) by 120 days.

(21) Appl. No.: 15/892,018

(22) Filed: Feb. 8, 2018

(65) Prior Publication Data

US 2019/0132496 A1    May 2, 2019

(30) Foreign Application Priority Data

Oct. 31, 2017  (KR) .................. 10-2017-0143419

(51) Int. Cl.
*H04N 5/225* (2006.01)
*H04N 5/232* (2006.01)

(52) U.S. Cl.
CPC ......... *H04N 5/2253* (2013.01); *H04N 5/2251* (2013.01); *H04N 5/23212* (2013.01); *H04N 5/23296* (2013.01)

(58) Field of Classification Search
None
See application file for complete search history.

(56) References Cited

U.S. PATENT DOCUMENTS

| | | | | |
|---|---|---|---|---|
| 6,685,326 B2* | 2/2004 | Debevec | ................ | G03B 15/02 348/E5.058 |
| 2006/0249689 A1* | 11/2006 | Eustergerling | ....... | A61B 5/0059 250/458.1 |
| 2009/0002496 A1* | 1/2009 | Esmaeili | ................ | A01K 1/031 348/207.1 |
| 2015/0323664 A1* | 11/2015 | Wu | ........................ | G01V 8/005 342/22 |
| 2017/0076487 A1* | 3/2017 | Moore | ................ | A61B 5/1075 |
| 2017/0353711 A1* | 12/2017 | Wayenberg | ............ | G01G 19/50 |
| 2018/0289428 A1* | 10/2018 | Lee | ........................ | A61B 90/37 |

FOREIGN PATENT DOCUMENTS

KR          10-1616176          2/2014

OTHER PUBLICATIONS

English Abstract of KR 10-2015-0101836 (which is KR 10-1616176).

* cited by examiner

*Primary Examiner* — Edemio Navas, Jr.
(74) *Attorney, Agent, or Firm* — Ladas & Parry, LLP

(57) ABSTRACT

The object photographing system using spiral rail according to one embodiment of the present invention comprises a spiral rail in which an object is disposed in an inner space, at least one photographing unit movably mounted along the spiral rail for photographing the object, and a control system for controlling the position and operation of the at least one camera; since it is possible to photograph an object in various directions and at various angles with only a small number of cameras without having to arrange a large number of cameras surrounding the subject, the cost of constructing the imaging system can be minimized, the power consumption is reduced, and the imaging system can be easily managed.

16 Claims, 6 Drawing Sheets

OBJECT PHOTOGRAPHING SYSTEM USING SPIRAL RAIL

CROSS REFERENCE TO RELATED APPLICATION

This patent application claims the benefit under 35 U.S.C. Sections 119 of Korean patent application no. 10-2017-0143419 filed on Oct. 31, 2017, which is hereby incorporated by reference in its entirety.

BACKGROUND OF THE INVENTION

Field of the Invention

The present invention relates to an object photographing system using spiral rail.

Related Art

In order to produce a 3D figure of a real object using a 3D printer, 3D modeling data for the object are required. Further, the 3D modeling data for the object can be obtained by photographing the subject in various directions and at various angles, and synthesizing and converting the photographed images.

Generally, a technique of acquiring images of an object in various directions and at various angles using a camera such as a DSLR capable of acquiring a 2D image of an object requires arranging a large number of cameras so as to surround the object, so that considerable cost is required to construct the photographing system. In addition, since a plurality of cameras must be used to photograph the object, there is a problem that the degree of power consumption is large and it is difficult to manage the cameras, which are problematic.

Korean Patent No. 10-1616176 B1 (publication No. 10-2015-0101836) relates to a human body high-speed stereoscopic scanning apparatus; since a large number of expensive 3D scanner sensors are used to acquire the stereoscopic information of the human body viewed from each orientation, there is a problem in that it is expensive to construct a scan system.

SUMMARY OF THE INVENTION

Problems the Invention is to Solve

It is an object of the present invention to provide an object photographing system using spiral rail capable of photographing an object in various directions and at various angles with only a small number of cameras.

Means for Solving the Problems

In order to solve the above-stated problems, the object photographing system using spiral rail according to one embodiment of the present invention comprises:

a spiral rail in which an object is disposed in an inner space, at least one photographing unit movably mounted along the spiral rail for photographing the object; and a control system for controlling the position and operation of the at least one camera.

In the object photographing system using spiral rail according to one embodiment of the present invention, the at least one photographing unit may respectively comprise:

a photographing module for photographing the object, an angle adjustment driving unit for adjusting the angles of the camera, and a position adjustment driving unit for adjusting the position of the camera on the spiral rail.

In addition, in the object photographing system using spiral rail according to one embodiment of the present invention, the control system comprises the following:

a photographing unit comprising a focus adjustment signal generating unit for generating a focus adjustment signal for adjusting the focus of the photographing unit, a photographing signal generating unit for generating a photographing signal for allowing the photographing unit to photograph the object, and an image information storing unit for receiving and storing image information of the photographed object photographed by the photographing unit;

a photographing position control unit comprising an angle adjustment signal generating unit for generating an angle adjustment signal for adjusting the angle of the photographing unit, a position adjustment signal generating unit for generating a position adjustment signal for adjusting the position of the photographing unit on the spiral rail, an initial photographing position determining unit for determining an initial photographing position of the photographing unit, and a photographing end position determining unit for determining a photographing end position of the photographing unit; and a control unit for controlling operations of the image unit and the photographing position control unit.

In addition, in the object photographing system using spiral rail according to one embodiment of the present invention, the photographing unit further comprises the photographing module, the angle adjustment driving unit, and a first signal transmitting and receiving unit connected to the position adjusting driving unit for transmitting and receiving signals; the control system may comprise the image unit, the photographing position control unit, and a second signal transmission/reception unit connected to the control unit for transmitting and receiving signals.

Further, in order to detect that the photographing unit located at the lowermost one of the at least one photographing unit reaches the end of the spiral rail, the object photographing system using spiral rail according to another embodiment of the present invention further comprises a photographing unit detecting unit disposed near the end of the lower end of the spiral rail.

In addition, in the object photographing system using spiral rail according to one embodiment of the present invention, the control system is able to perform the following operations:

(a) operation of moving the at least one photographing unit to an initial photographing position;

(b) operation of adjusting the angle of each of the photographing units so that the lens of the photographing module of the at least one photographing unit faces the object;

(c) operation of adjusting the focus of each of the photographing units so that the focus of the at least one photographing unit matches the object;

(d) operations of generating a photographing signal for causing the at least one photographing unit to photograph the object and transmitting the signal to each of the photographing units;

(e) operations of receiving and storing image information of the object photographed by the at least one photographing unit from the respective photographing units;

(f) operation of transmitting a photographing position adjustment signal to the at least one photographing unit to move each photographing unit along the spiral rail by a predetermined distance; and (g) when it is judged whether the photographing unit positioned at the lowermost end of the at least one photographing unit has reached the end of the spiral rail, and it is determined that the photographing unit positioned at the lowermost end has not reached the end of the helical rail, the process proceeds to step (b), and when the photographing unit located at the lowermost end reaches the end of the spiral rail, the operation of ending the photographing.

Moreover, the object photographing system using spiral rail according to one embodiment of the present invention may further comprise an additional spiral rail mounted above the spiral rail, and an additional at least one photographing unit movably mounted along the additional spiral rail for photographing the object.

In addition, in the object photographing system using spiral rail according to one embodiment of the present invention, the photographing unit may comprise any one selected from the group consisting of a 2D camera, a 3D camera, and a 3D scanner.

Effects of the Invention

According to the object photographing system using spiral rail according to one embodiment of the present invention, since it is possible to photograph an object in various directions and at various angles with only a small number of cameras without having to arrange a large number of cameras surrounding the subject, the cost of constructing the imaging system can be minimized, the power consumption is reduced, and the imaging system can be easily managed.

DETAILED DESCRIPTION OF THE PREFERRED EMBODIMENTS

Figure 1:
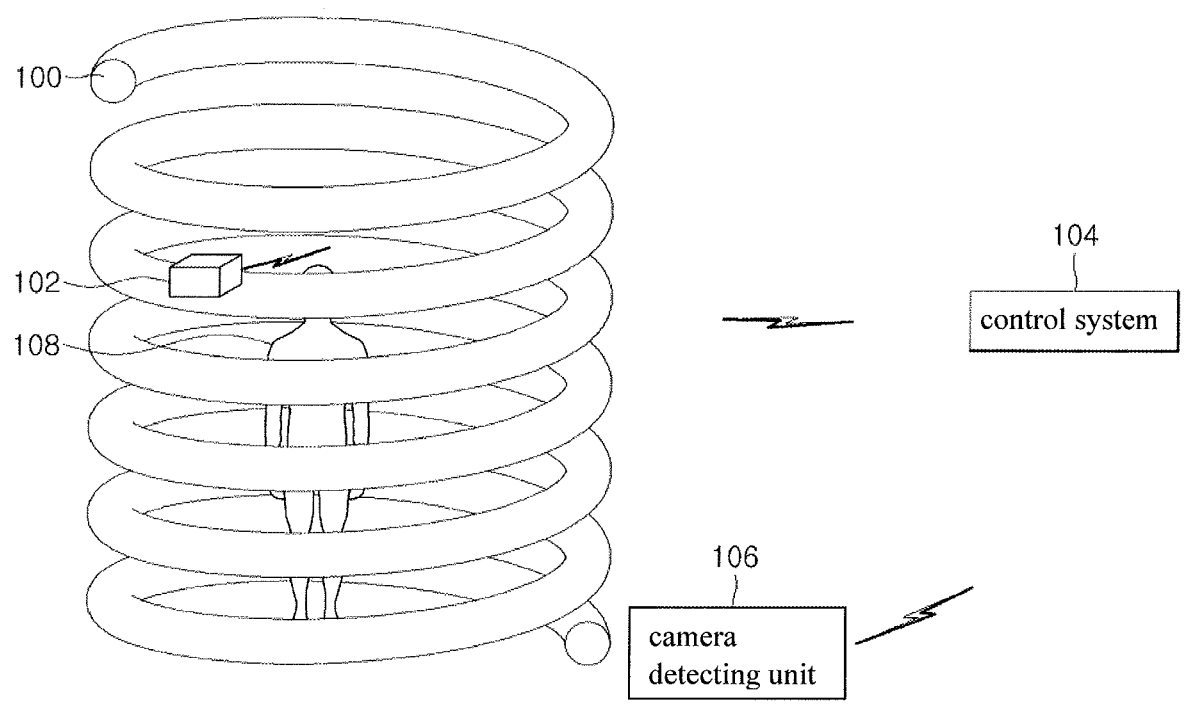
FIG. 1 is a drawing depicting the object photographing system using spiral rail according to one embodiment of the present invention.

The objectives, specific advantages, and novel features of the present invention will become more apparent from the following detailed description and preferred embodiments taken in conjunction with the accompanying drawings.

First, terms and words used in the present specification and claims should not be construed in a conventional and dictionary sense; they should be construed in accordance with the meanings and concepts consistent with the technical ideas of the present invention based on the principle of properly defining the concepts of the terms in order for the inventors to explain this invention in the best way possible.

In the present specification, in adding reference numerals to the constituent elements of each drawing, it should be noted that to the extent possible, the same constituent elements have the same number even when they are displayed in different drawings.

Furthermore, the terms "first," "second," "one side," "other side" and the like are used to distinguish one constituent element from another, and the constituent elements are not limited by these terms.

In the following description of the present invention, detailed description of related arts which may unnecessarily obscure the gist of the present invention will be omitted.

Hereinafter, preferred embodiments of the present invention will be described in detail with reference to the accompanying drawings.

Referring to FIG. 1, the object photographing system using spiral rail according to one embodiment of the present invention comprises a spiral rail 100 in which an object 108 to be photographed is disposed in an inner space, a camera 102 movably mounted along the spiral rail 100 to photograph the object 108, and a control system 104 for controlling the position and operation of the camera 102.

The camera 102 may be any one selected from the group consisting of a 2D camera, a 3D camera, and a 3D scanner as a photographing unit for capturing an image of an object 108.

Figure 2:
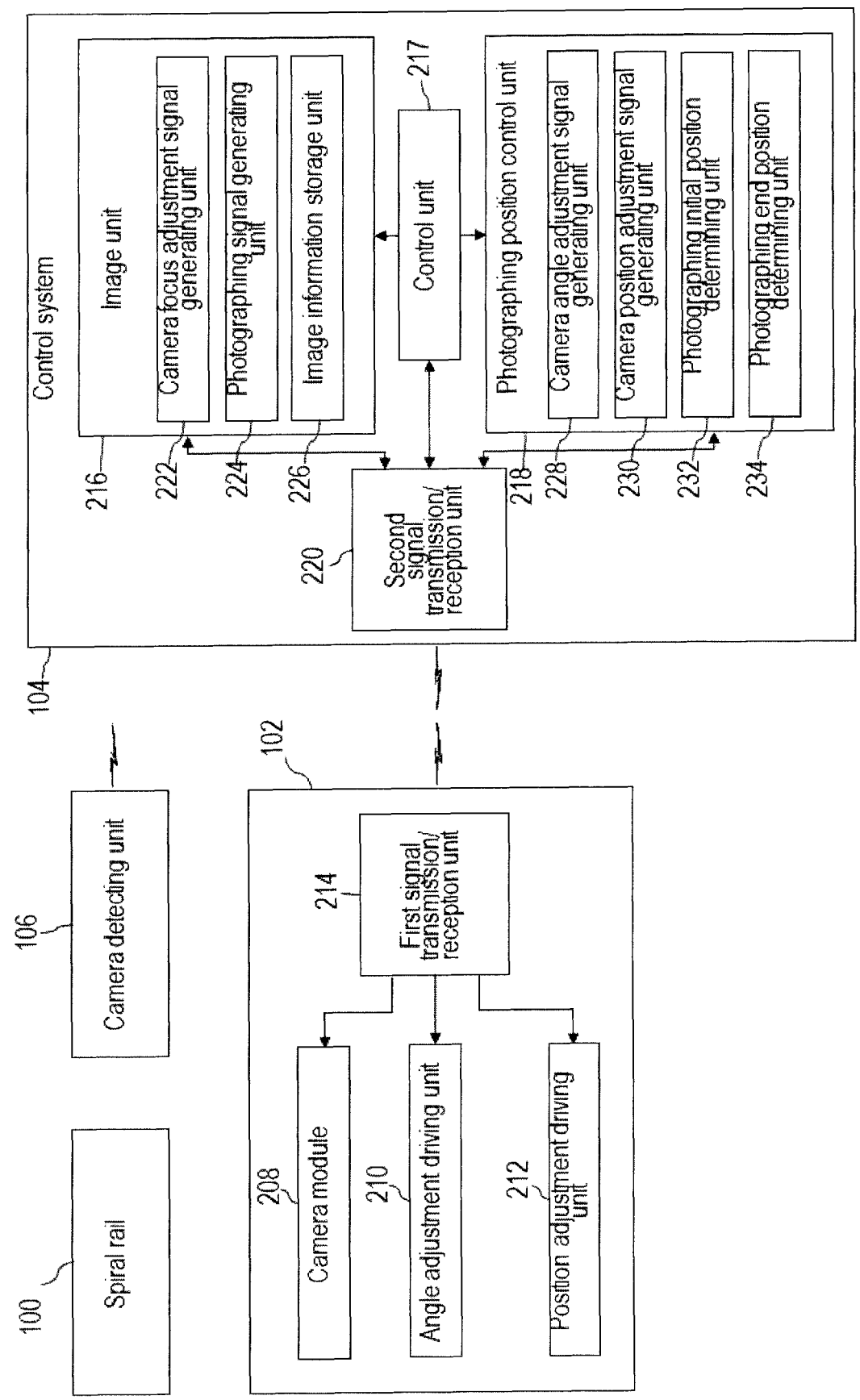
FIG. 2 is a drawing depicting a detailed block diagram of the object photographing system using spiral rail according to one embodiment of the present invention.
Figure 4:
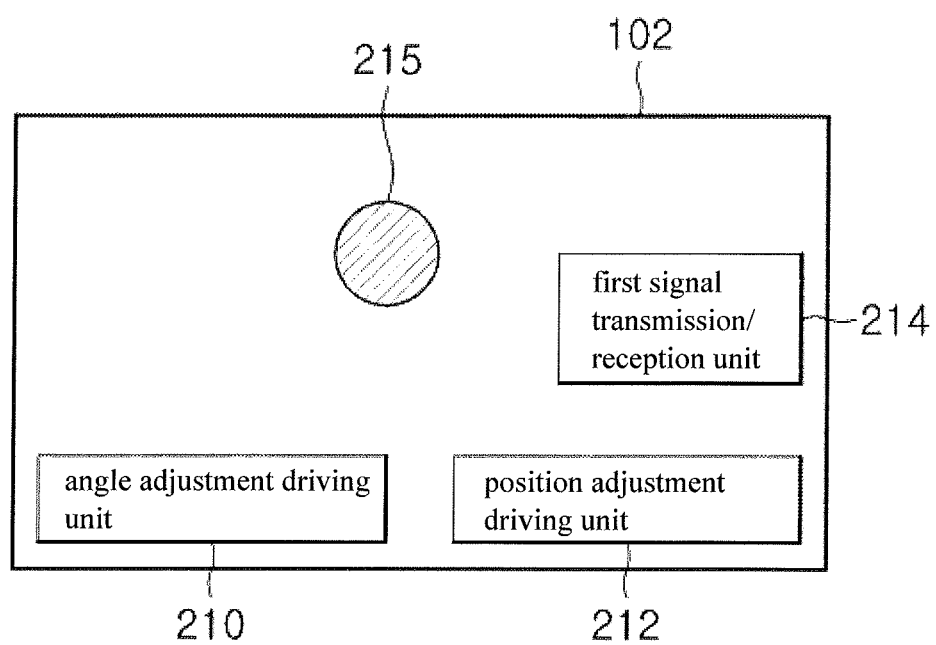
FIG. 4 is a detailed view of the camera.
Figure 5:
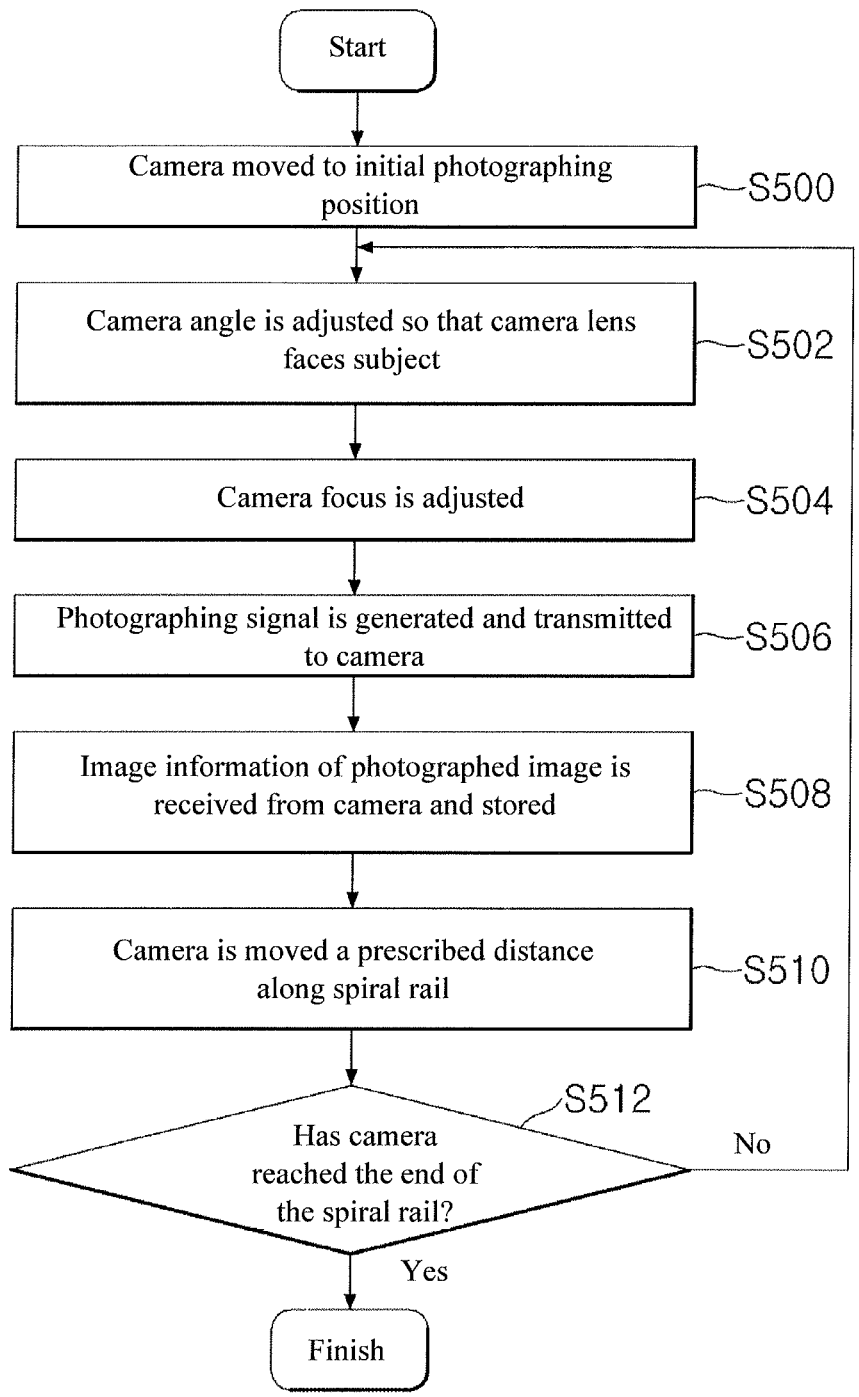
FIG. 5 is a flowchart illustrating the operations of the object photographing system using spiral rail according to one embodiment of the present invention.

Referring to FIGS. 1 and 2, the camera 102 comprises a camera module 208 for photographing the object 108, an angle adjustment driving unit 210 for adjusting the angle of the camera 102, a position adjustment driving unit 212 for adjusting the position of the camera 102 on the spiral rail 100, and a first signal transmission/reception unit 214 for transmitting and receiving signals. Further, as shown in FIG. 4, camera 102 comprises a lens 215 on the front surface of the camera module 208.

In the first embodiment of the present invention, although the angle adjustment driving unit 210, the position adjustment driving unit 212, and the first signal transmission/reception unit 214 are comprised in the camera 102, the present invention is not limited to this, and the angle adjustment driving unit 210, the position adjustment driving unit 212 and the first signal transmission/reception unit 214 may be separately configured from the camera module 208 and may be coupled to the camera module 208.

Referring to FIGS. 1 and 2, the control system 104 comprises an image unit 216, a photographing position control unit 218, a control unit 217, and a second signal transmission/reception unit 220.

The image unit 216 comprises a camera focus adjustment signal generating unit 222 for generating a focus adjustment signal for adjusting the focus of the camera 102, a photographing signal generating unit 224 for generating a photographing signal for photographing the virtual base subject 108 of the camera 102, and an image information storage unit 226 for receiving and storing image information of the object 108 photographed by the camera 102 from the camera 102.

The photographing position control unit 218 comprises a camera angle adjustment signal generator 228 for generating an angle adjustment signal for adjusting the angle of the camera 102, a camera position adjustment signal generator 230 for generating a position adjustment signal for adjusting the position of the camera 102 on the spiral rail 100, an initial photographing position determining unit 232 for determining an initial photographing position of the camera 102, and a photographing end position determining unit 234 for determining the photographing end position of the camera 102.

The control unit 217 is connected to the image unit 216, the photographing position control unit 218 and the second signal transmission/reception unit 220, and it controls the operations of the image unit 216, the photographing position control unit 218, and the second signal transmission/reception unit 220 according to the present invention.

Moreover, in referring to FIG. 1 and FIG. 2, the object photographing system using spiral rail according to one embodiment of the present invention further comprises a camera detecting unit 106 disposed near the end of the lower end of the spiral rail 100 in order to detect that the camera 102 has reached the end of the spiral rail 100.

In FIG. 2, the first signal transmission/reception unit 214 and the second signal transmission/reception unit 220 transmit and receive signals between each other.

Hereinafter, the operations of the object photographing system using spiral rail according to one embodiment of the present invention will be described with reference to the accompanying drawings.

In the object photographing system using spiral rail according to one embodiment of the present invention, since the camera 102 is freely movable along the spiral rail 100 and the angle of the camera 102 can be arbitrarily adjusted so that the camera 102 faces the object 108, when the camera 102 is moved from top to bottom along the spiral rail 100, the position of the camera 102 can be positioned at any height from the top to the bottom of the object 108 and in any direction.

Therefore, the object 108 can be photographed at any position at various heights, various directions, and at various angles using one camera 102 or a small number of cameras.

In the object photographing system using spiral rail according to one embodiment of the present invention, the camera 102 moves up and down along the spiral rail 100 to photograph the object 108; however, in the first embodiment of the present invention this is not limited, and it is also possible to photograph the object 108 while moving the camera 102 from the bottom to the top along the spiral rail 100.

The operation of the object photographing system using spiral rail according to one embodiment of the present invention will be described with reference to FIGS. 1 through 5.

In step S500, the control system 104 determines an initial photographing position of the camera 102 on the spiral rail 100, and then based on this, a camera position adjustment signal is generated and transmitted to the camera 102, so that the camera 102 is moved to the photographing initial position on the spiral rail 100.

When the height difference between the object 108 and the spiral rail 100 is large, if the camera 102 is positioned at the uppermost position of the spiral rail 100 to start photographing, the object 108 may not be photographed by the camera 102; however, unnecessary photographing can be continued until the camera 102 moves to the position of the spiral rail 100 corresponding to the height near the upper end of the object 108.

In order to prevent such unnecessary photographing, the photographing initial position determining unit 232 estimates the height of the object 108 based on the image of the object 108 acquired by the camera 102, and determines an initial photographing position on the spiral rail 100 according to the estimated height of the object 108. The camera position adjustment signal generating unit 230 generates a camera position adjustment signal in accordance with the determined initial photographing position and transmits it to the camera 102.

The position adjustment driving unit 212 of the camera 102 moves the camera 102 to the photographing initial position on the spiral rail 100 in accordance with the received camera position adjustment signal. By this step, the camera 102 is positioned near the upper end of the object 108.

In step S502, the control system 104 adjusts the angle of the camera 102 such that the lens 215 of the camera module 208 performing the imaging function in the camera 102 faces the object 108.

Figure 3:
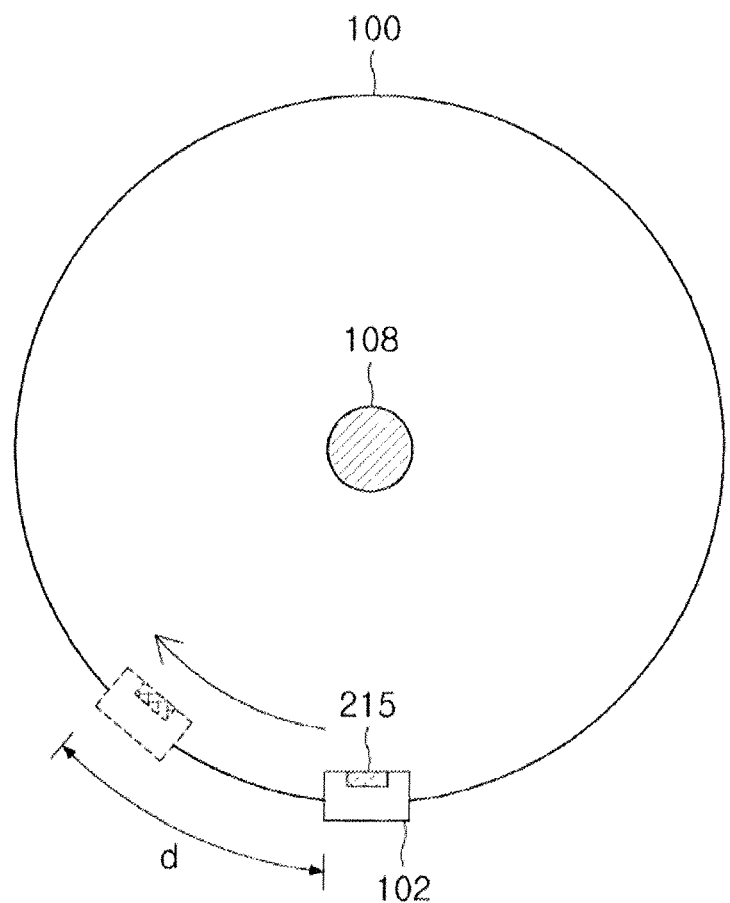
FIG. 3 is a top view of the spiral rail depicted in FIG. 1.

The camera angle adjustment signal generating unit 228 in the imaging position control unit 218 generates a camera angle adjustment signal and transmits it to the camera 102, and the angle adjustment driving unit 210 adjusts the angle of the camera 102 according to the received camera angle adjustment signal; therefore, as shown in FIG. 3, the lens 215 of the camera module 208 is directed toward the object 108.

In step S504, the camera focus adjustment signal generating unit 222 of the control system 104 generates a camera focus adjustment signal so that the focus of the camera 102 matches the object 108 and transmits a focus adjustment signal to the camera 102; the camera module 208 of the camera 102 adjusts the focus of the camera 102 in accordance with the received focus adjustment signal so that focus of the camera 102 matches the object 108.

In step S506, the photographing signal generating unit 224 of the control system 104 generates a photographing signal so that the camera 102 photographs the object 108 and transmits the photographing signal to the camera 102; the camera module 208 photographs the object 108 according to the received photographing signal.

The image information of the object 108 photographed by the camera module 208 is transmitted to the control system 104; in step S508, the image information storage unit 226 stores the image information of the object 108 to be received.

In step S510, the camera position adjustment signal generating unit 230 of the control system 104 generates a position adjustment signal and transmits it to the camera 102; as shown in FIG. 3, the position adjustment driving unit 212 of the camera 102 moves the camera 102 along the spiral rail 100 by a predetermined distance (d) according to the received position adjustment signal.

In step S512, the photographing end position determining unit 234 of the control system 104 determines whether the camera 102 has reached the end of the spiral rail 100; if the camera 102 does not reach the end of the spiral rail 100, the flow advances to step S502 to continuously photograph the object 108 while moving the camera 102 over the spiral rail 100 by a predetermined distance. If the camera 102 reaches the end of the spiral rail 100, it is regarded that all of the photographing of the object 108 has been completed, and the photographing is ended.

A camera detecting unit 106 is disposed near the end of the spiral rail 100; if the camera detecting unit 106 detects that the camera 102 has reached the end of the spiral rail 100, it transmits a signal to the control system 104 that the camera 102 has reached the end of the spiral rail 100.

The photographing end position determining unit 234 of the control system 104 determines whether the camera 102 has reached the end of the spiral rail 100 based on the signal received from the camera detecting unit 106.

Figure 6:
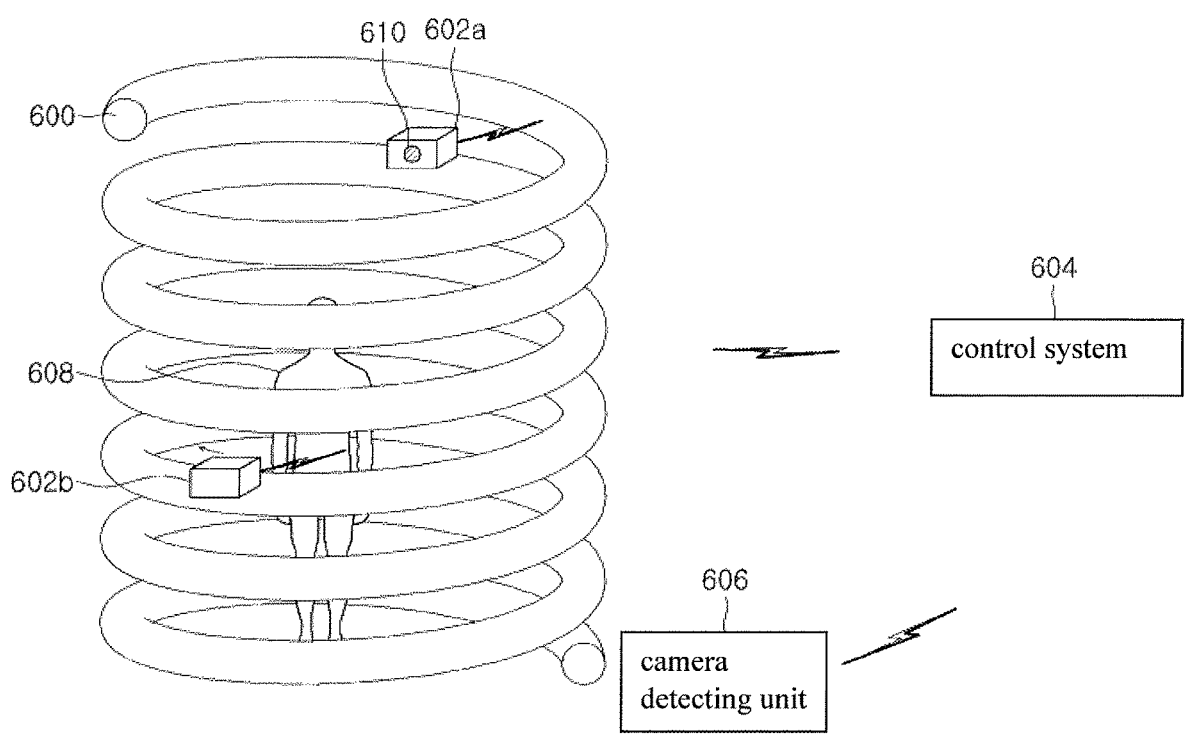
FIG. 6 is a drawing depicting the object photographing system using spiral rail according to another embodiment of the present invention.

Meanwhile, FIG. 6 is a drawing depicting the object photographing system using spiral rail according to another embodiment of the present invention.

In the object photographing system using spiral rail according to another embodiment of the present invention shown in FIG. 6, two cameras 602a and 602b are arranged on the spiral rail 600 at regular intervals. In FIG. 6, reference numeral 610 denotes a lens of the camera 602a.

Under the control of the control system 604, the first camera 602a photographs the object 608 while moving a predetermined distance along the area of the spiral rail 600 at the upper portion of the second camera 602b, and the second camera 602b photographs the object 608 while moving a predetermined distance along the remaining area of the helical rail 600.

A camera detecting unit 606 is disposed near the end of the spiral rail 600; when the second camera 602b reaches the end of the spiral rail 600, the camera detecting unit 606 detects this and transmits a signal to the control system 604 that the second camera 602b has reached the end of the spiral rail 600.

When the second camera 602b reaches the end of the spiral rail 600, the control system 604 regards that the photographing of the object 608 is complete and ends the photographing.

Except for the control system 604 controlling the operations of the two cameras 602a and 602b, the operations of the object photographing system using spiral rail according to another embodiment of the present invention depicted in FIG. 6 are similar to the operations of the object photographing system using the spiral rail depicted in FIG. 1 and are omitted.

Since the object photographing system using spiral rail according to another embodiment of the present invention depicted in FIG. 6 photographs the object 608 with the two cameras 602a and 602b, the photographing speed is twice as fast as that of the object photographing system using spiral rail shown in FIG. 1, which is advantageous.

Meanwhile, with the object photographing system using spiral rail according to one embodiment of the present invention, the same spiral rails are added on the spiral rails 100 and 600, so that it is possible to arrange at least one camera on the added helical rails to extend the entire photographing height.

Each module and unit described above can be hardware or software or a combination of both. For example, single-board microcontrollers or microcontroller kits provided by Arduino® can be used to create each module and unit.

The spiral rail is a spiral-shaped pathway on which or through which the camera module can travel. The spiral rail can be made of metal and its orthogonal section can be C-shaped. The opening of the C-shaped spiral rail can face the spiral axis of the spiral rail so that the camera module can face an object placed within the spiral rail. Inside and along the rail, a long spiral-shaped gear rack can be inserted. The size of the spiral rail can differ depending on an object to be photographed.

The position adjustment driving unit comprises a gear that can travel on the long spiral-shaped gear rack.

The camera module can comprise a camera and a camera housing, wherein the camera housing can be mounted on the spiral rail. The camera can be an ordinary camera, cellphone camera, high performance DSLR camera or camera module such as an Arduino® camera module. If an ordinary camera is used, an additional camera housing, camera wheels, and corresponding processors can be used to mount the camera on the spiral rail. When an Arduino® camera module (with a wireless Shield included) is used, the mounting structure would be different and simpler. The camera housing can be T-shaped so that the position adjustment unit can be attached on one edge of the T-shaped camera housing, the gear of the position adjustment unit biting or interlocking the gear rack of the spiral rail.

The control system can comprise an Arduino module that comprises a servo motor, a position sensor, a data processing chip, and a wireless signal sender/receiver.

The camera detecting unit can comprise a position detecting sensor that detects the current location of the camera or detects whether the camera has reached an end of the spiral rail.

The control system can control the abovementioned units and modules. The control system can comprise a wirelessly connected computer that gives a command to drive the camera module, to take a photo, or to receive photo data.

The angle adjustment driving unit can comprise a small rod, gears, and a servo motor. The servo motor drives the gears to change the angle of the rod that is connected to the camera module.

The position adjustment driving unit can comprise a servo motor and gears. The servo motor drives the gears by exact amount which would, in turn, determine how much to travel on the rail.

The first signal transmission/reception unit can comprise a transceiver.

While the present invention has been described in detail with reference to exemplary embodiments thereof, this is for the purpose of illustrating the present invention specifically, the present invention is not limited thereto, and it will be apparent that changes and modifications may be made by those skilled in the art within the scope of the present invention.

All such modifications and variations are intended to be included within the scope of the present invention; the specific scope of protection of the present invention will be apparent from the appended claims.

As noted above, the present invention or any part(s) or function(s) thereof, including but not limited to elements denoted by reference numerals 104, 106, 208, 210, 212, 214, 216, 217, 218, 220, 222, 224, 226, 228, 230, 232, 234, 604, and 606 may be implemented using hardware, software, or a combination thereof, and may be implemented in one or more computer systems or other processing systems and using mobile apps. A computer system for performing the operations of the present invention and capable of carrying out the functionality described herein can include one or more processors connected to a communications infrastructure (e.g., a communications bus, a cross-over bar, or a network). After reading this description, it will become apparent to a person skilled in the relevant art(s) how to implement the invention using other computer systems and/or architectures.

The computer system can include a display interface that forwards graphics, text, and other data from the communication infrastructure (or from a frame buffer) for display on a display unit. The display interface can communicate with a browser. The computer system also includes a main memory, preferably a random access memory, and may also include a secondary memory and a database. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. The removable storage unit can represent a floppy disk, magnetic tape, optical disk, etc. which is read by and written to by the removable storage drive. As will be appreciated, the removable storage unit can include a computer usable storage medium having stored therein computer software and/or data.

The computer system may also include a communications interface which allows software and data to be transferred between the computer system and external devices. The terms "computer program medium" and "computer usable medium" are used to refer generally to media such as the removable storage drive, a hard disk installed in the hard disk drive, and signals. These computer program products provide software to the computer system.

Computer programs or control logic are stored in the main memory and/or the secondary memory. Computer programs may also be received via the communications interface. Such computer programs or control logic (software), when executed, causes the computer system or its processor to perform the features and functions of the present invention, as discussed herein.

Accordingly, software embodiments of the present invention may be provided as a computer program product, or software, that may include an article of manufacture on a machine accessible or machine readable medium (memory) having instructions. The instructions on the machine accessible or machine readable medium may be used to program a computer system or other electronic device. The machine-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the Figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

DESCRIPTION OF REFERENCE NUMERALS 100, 600: spiral rail
102: camera
104: control system
106: camera detecting unit
108, 608: object
208: camera module
210: angle adjustment driving unit
212: position adjustment driving unit
214: first signal transmission/reception unit
215, 610: lens
216: image unit
217: control unit
218: photographing position control unit
220: second signal transmission/reception unit
222: camera focus adjustment signal generating unit
224: photographing signal generating unit
226: image information storage unit
228: camera angle adjustment signal generating unit
230: camera position adjustment signal generating unit
232: photographing initial position determining unit
234: photographing end position determining unit
602a: first camera
602b: second camera
604: control system
606: camera detecting unit

What is claimed is:

1. An object photographing system using spiral rail, comprising:
a spiral rail, wherein an object can be disposed in an inner space of the spiral rail,
at least one photographing unit movably mounted along the spiral rail that is adapted to photograph the object, and
a control system that is adapted to control a position and an operation of the at least one photographing unit,
wherein the spiral rail is a helix structure helically wound about a central axis of the spiral rail at a distance from the central axis, wherein the central axis of the spiral rail is perpendicular to the ground,
wherein the spiral rail configured to be mounted by a plurality of photographing units that are adapted to move along the spiral rail, and
wherein the spiral rail is configured to be mounted by an additional spiral rail on top of the spiral rail, wherein the additional spiral rail has a configuration identical to the spiral rail.

2. The object photographing system using spiral rail according to claim 1, wherein:
the at least one photographing unit respectively comprises:
a photographing module that is adapted to photograph the object,
an angle adjustment driving unit that is adapted to adjust an angle of a camera, and
a position adjustment driving unit that is adapted to adjust the position of the camera on the spiral rail.

3. The object photographing system using spiral rail according to claim 2,
wherein the control system comprises:
(a) an image unit comprising:
a focus adjustment signal generating unit that is adapted to generate a focus adjustment signal to adjust a focus of the photographing unit,
a photographing signal generating unit that is adapted to generate a photographing signal to allow the photographing unit to photograph the object, and
an image information storing unit that is adapted to receive and store image information of the object photographed by the photographing unit;

(b) a photographing position control unit comprising an angle adjustment signal generating unit that is adapted to generate an angle adjustment signal to adjust an angle of the photographing unit, a position adjustment signal generating unit that is adapted to generate a position adjustment signal to adjust a position of the photographing unit on the spiral rail, an initial photographing position determining unit that is adapted to determine an initial photographing position of the photographing unit, and a photographing end position determining unit that is adapted to determine a photographing end position of the photographing unit; and (c) a control unit that is adapted to control operations of the image unit and the photographing position control unit.

4. The object photographing system using spiral rail according to claim 3, wherein:

the at least one photographing unit further comprises a first signal transmission/reception unit; and the control system further comprises a second signal transmission/reception unit;

wherein the first signal transmission/reception unit is adapted to transmit and receive signals to and from the photographing module, the angle adjustment driving unit, the position adjustment driving unit, and the second signal transmission/reception unit, and wherein the second signal transmission/reception unit is adapted to transmit and receive signals to and from the first signal transmission/reception unit, the control unit, the image unit, and the photographing position control unit.

5. The object photographing system using spiral rail according to claim 4, further comprising a camera detecting unit disposed near a lower end of the spiral rail, wherein the camera detecting unit is adapted to detect that the photographing unit located at the lowermost one of the at least one photographing unit has reached the end of the spiral rail.

6. The object photographing system using spiral rail according to claim 5, wherein the control system performs the steps of:

(a) moving each of the at least one photographing unit to respective initial photographing positions on the spiral rail;

(b) adjusting an angle of each of the photographing units so that a lens of the photographing module of each of the at least one photographing unit faces the object;

(c) adjusting a focus of each of the photographing units so that the focus of the at least one photographing unit matches the object;

(d) generating, by the photographing signal generating unit, a photographing signal to cause the at least one photographing unit to photograph the object, and transmitting, by the second signal transmission/reception unit, the photographing signal to the first signal transmission/reception unit of each of the at least one photographing unit;

(e) receiving and storing, by the image information storing unit, image information of the object photographed by the at least one photographing unit from the each of the at least one photographing unit;

(f) transmitting, by the second signal transmission/reception unit, a photographing position adjustment signal to the first signal transmission/reception unit of the at least one photographing unit that causes each of the at least one photographing unit to move along the spiral rail by a predetermined distance; and (g) determining whether a photographing unit positioned at the lowermost end of the at least one photographing unit has reached the lower end of the spiral rail, and when the photographing unit positioned at the lowermost end is determined not to have reached the end of the spiral rail, performing steps (b)-(f), or when the photographing unit located at the lowermost end is determined to have reached the end of the spiral rail, terminating photographing process.

7. The object photographing system using spiral rail according to claim 5, further comprising the additional spiral rail mounted on the spiral rail, and at least one additional photographing unit movably mounted along the additional spiral rail adapted to photograph the object.

8. The object photographing system using spiral rail according to claim 7, the at least one photographing unit comprises any one selected from a group consisting of a 2D camera, a 3D camera, and a 3D scanner.

9. An object photographing system using spiral rail, comprising:

a spiral rail, wherein an object can be disposed in an inner space of the spiral rail, wherein the spiral rail is a helix structure helically wound about a central axis of the spiral rail at a distance from the central axis, wherein the central axis of the spiral rail is perpendicular to the ground, wherein the spiral rail is configured to be mounted by a plurality of photographing units that is adapted to move along the spiral rail, and wherein the spiral rail is configured to be extended further by mounting an additional spiral rail on top of the spiral rail, wherein the additional spiral rail has a configuration identical to the spiral rail;

wherein said object photographing system further comprises:

(a) a first photographing unit, comprising:
a body,
a first signal transmission unit, comprising a first transceiver,
an angle adjustment driving unit, comprising actuators,
a position adjustment driving unit, comprising a motor, and
a camera; and (b) a control system, comprising:
a processor, wherein the processor is configured to generate: a focus adjustment signal that adjusts a focus of the camera, a photographing signal that causes the camera to photograph, an angle adjustment signal that causes the actuators to adjust the angle of the camera, and a position adjustment signal that adjusts a position of the first photographing unit on the spiral rail.

10. The object photographing system using spiral rail according to claim 9, comprising:

a camera detecting unit disposed near a lower end of the spiral rail, comprising a sensor that detects whether the first photographing unit has reached the lower end of the spiral rail, and a transmitter that transmits to the control system a signal that indicates the first photographing unit has reached the lower end of the spiral rail.

11. The object photographing system using spiral rail according to claim 10, wherein the processor is further configured to estimate a height of the object based on an image of the object acquired by the camera and to determine which position on the spiral rail would be an initial photographing position of the camera to prevent unnecessary photographing when the first photographing unit moves down along the spiral rail from a top end of the spiral rail.

12. The object photographing system using spiral rail according to claim 10, further comprising a second photographing unit, wherein the second photographing unit is disposed on the spiral rail higher than the first photographing unit, wherein the first and second photographing units move upward or downward along the spiral rail at a same speed, and wherein the control system controls the first and the second photographing units.

13. A method for photographing an object, comprising:
- (a) providing the object photographing system of claim 11;
- (b) placing the first photographing unit at a first position on the spiral rail;
- (c) placing the object in an inner space of the spiral rail;
- (d) estimating a height of the object based on the image of the object acquired by the first photographing unit;
- (e) determining an initial photographing position of the first photographing unit based on the estimation of step (d);
- (f) moving the first photographing unit downward along the spiral rail, and when the first photographing unit reaches the initial photographing position, causing the first photographing unit to photograph the object while moving downward along the spiral rail;
- (g) transmitting images captured by the first photographing unit to the control system; and
- (h) ending step (f) when the camera detecting unit detects that the first photographing unit has reached the lower end of the spiral rail.

14. The method for photographing an object according to claim 13, comprising:
- placing the second photographing unit at a second position on the spiral rail, wherein the second position is further from the object than the first position of the first photographing unit is; and
- causing the first and the second photographing units to photograph the object while moving downward along the spiral rail at a same speed as each other.

15. The method for photographing an object according to claim 14, comprising:
- placing an additional spiral rail on top of the spiral rail to extend a photographable height.

16. A non-transitory computer-readable storage medium storing a program which, when executed by at least one processor, performs the method for photographing an object according to claim 15.

* * * * *